R. LUNDELL.
DYNAMO ELECTRIC MACHINE AND SYSTEM OF CONTROL.
APPLICATION FILED NOV. 28, 1913.
1,117,872.
Patented Nov. 17, 1914.
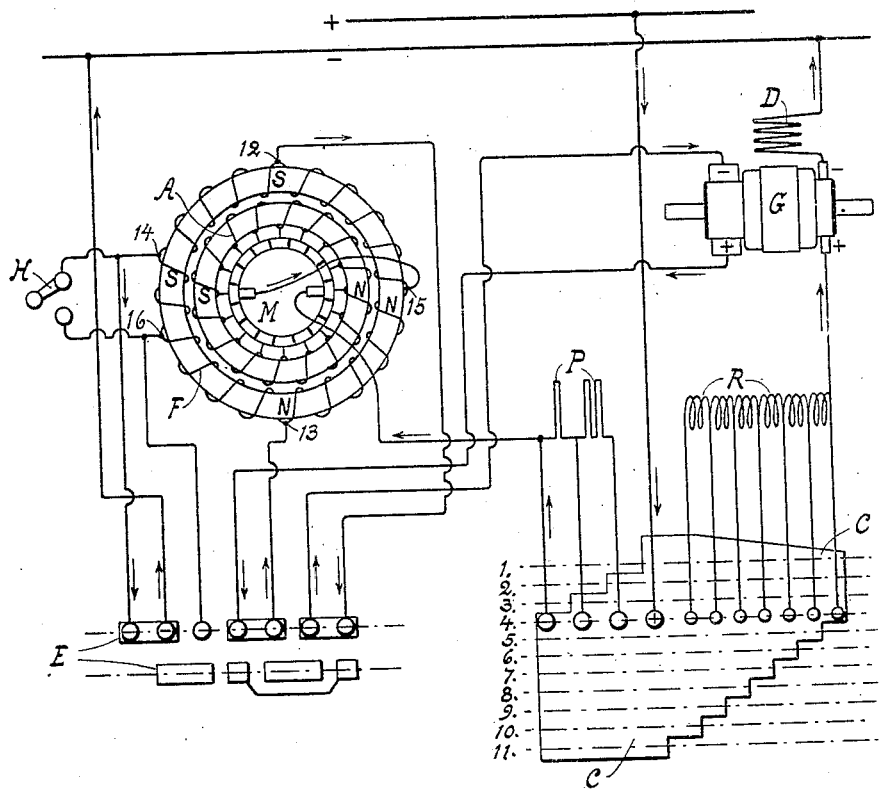

UNITED STATES PATENT OFFICE.

ROBERT LUNDELL, OF NEW YORK, N. Y.

DYNAMO-ELECTRIC MACHINE AND SYSTEM OF CONTROL.

1,117,872.

Specification of Letters Patent. Patented Nov. 17, 1914.

Application filed November 28, 1913. Serial No. 803,486.

*To all whom it may concern:*

Be it known that I, ROBERT LUNDELL, a citizen of the United States, and a resident of New York, borough of Manhattan, county and State of New York, have made a new and useful Invention in Dynamo-Electric Machines and Systems of Control, of which the following is a specification.

The present invention relates to improvements in that class of motors and dynamos in which the main field excitation is furnished by an independent or auxiliary source of E. M. F., and it relates in particular to improvements in the said auxiliary source of excitation.

The objects of the invention are:—first, to increase the efficiency of the said auxiliary source of E. M. F., particularly at its maximum load or duty. Second, to reduce the size, weight, cost, wear and tear of the said auxiliary source of E. M. F. to a minimum. Third, to effect improvements in regard to reliability, simplicity and flexibility of a system of control which comprises a line circuit, a main motor or generator, a reversing switch, a speed adjusting controller and an auxiliary source of field excitation for the said main motor or dynamo.

In my previous U. S. Patents No. 654,551 of July 24, 1900 and No. 857,184 of June 18th, 1907 I have shown and described an auxiliary source of variable E. M. F. consisting of a comparatively small motor-generator set, in which the motor-armature is connected to the line circuit and the generator-armature to the excitation windings of the main motor, both armatures being mechanically connected together. This unit was designed to run at a practically constant speed, no matter if the excitation current furnished by the generator-armature was to be large or small.

In the present invention the motor-generator is caused to run at a variable speed, from a maximum speed when the maximum duty is required to a minimum speed when the minimum duty is called for. That is to say, the motor-generator runs at its highest speed when the main machine (motor or dynamo) runs at its lowest speed and vice versa. The full load losses of the motor-generator are furthermore substantially reduced because only one armature core and only one field magnet are required for this unit, as will hereinafter be fully described.

Referring now to the accompanying drawing, which is diagrammatic, M represents a main motor or dynamo of the compensated type which I have previously fully described in U. S. Patent No. 857,184 above referred to, A and F representing respectively the distributed armature- and field- windings of the machine.

G represents an auxiliary source of E. M. F. and it consists of a motor generator unit in which the armature windings of the motor and the generator are both wound upon the same core, avoiding, thereby, the necessity for a second field magnet. This unit is consequently reduced to a simple rotary voltage transformer.

D represents a series field winding connected in series with the motor end (*i. e.* the high potential side) of the unit. The low voltage generator side of the motor-generator is by means of a reversing switch E connected to the excitation leads 12 and 13 of the main machine, said leads being located at 90 electrical degrees to the line of magnetization of the armature. as clearly shown on the drawing.

14, 15 and 16 indicate other leads or terminal points for connecting the distributed field winding of the main machine in series with its armature.

P represents starting resistances which, when not short-circuited, are in series with the armature winding of the main machine.

R represents a group of other relatively high resistances which are connected in series with the motor side of the motor-generator and which are arranged to become more or less short-circuited by a speed regulating controller C as shown on the drawing. These resistances serve the purpose of regulating the speed of the said motor-generator substantially in the same manner as the speed and the output of an ordinary series motor, which for example may be driving a fan, are regulated by similar external resistances.

Referring again to the leads or terminal points 14, 15 and 16 the terminal 15 is placed in exact line with the magnetization of the armature (the armature-field) as indicated on the drawing, whereas the other points 14 and 16 are placed at an angle to the said line of magnetization. I have found that, when a relatively weak field excitation only (*i. e.* a weak excitation component) is desired from the direct magnetizing effect of the main line current, it is not necessary to employ four separate leads or terminal points in a reversible machine, as shown and described in my previous Patent No. 857,184 above referred to.

The effect of the three point arrangement illustrated in the present diagram is approximately equivalent to an arrangement of four leads which are symmetrically placed with reference to one another and to the armature-field at an angle equal to one-half of the angle shown between the leads 14 and 16 in the present diagram. In other words, the leads 14 and 15 are approximately equivalent to another pair of leads which would be placed exactly 180 electrical degrees apart and at an angle to the line of armature-magnetization equal to one-half of the angle between the said lead 14 and the said line of armature-magnetization.

The present arrangement has the advantage of greater simplicity and makes it possible to connect the armature- and the compensating- windings permanently together as a single unit in a reversible machine. The direction of rotation of the main machine is in the present invention reversed by reversing the independent excitation obtained from the auxiliary source of E. M. F. and by shifting the main current terminal from point 14 to 16. In other words, the current through the armature- and the compensating- windings is not reversed, which in turn effects a distinct advantage (in a high potential system) in that the compensating winding may always remain on the negative or the ground side.

Having now called attention to the most important elements of my present invention the operation of the combined apparatus may best be described as follows:—Supposing that the reversing switch E is closed the controller C is first moved into the position indicated by the dotted line 1. The motor-generator is thereby caused to run up to its maximum speed as all of the external resistances R are short-circuited. The armature winding on the motor side of the motor-generator is now receiving its maximum E. M. F. from the line circuit and the low voltage generator side of the said motor-generator will consequently develop its maximum E. M. F. and current for the maximum independent excitation of the main machine M. In position 2 of the controller the main machine M has been started as a motor because the main line current is then flowing through the starting resistances P, the armature and the compensating winding point. At position 4 of the controller all of the starting resistances have become short-circuited and the main machine M is now operating directly across the line with its maximum independent field excitation and at its lowest fixed speed. Because of the angular displacement of the terminal 14 there is a slight field excitation produced by the main line current which is added to the independent excitation when the machine operates as a motor and which is subtracted therefrom when the machine is driven as a dynamo. In other words, the machine has a "compound characteristic" when working as a motor and a "differential characteristic" when working as a dynamo. In order to reverse these two characteristics it is only necessary to reverse the relative positions of the two left hand movable contacts of the reversing switch E. Furthermore, should a plain "shunt characteristic" be desired, such a characteristic is readily obtained by closing the switch H which is arranged to short-circuit the two terminal points 14 and 16.

In the following positions of the controller C, viz., 5 to 10 inclusive, the speed and the output of the motor-generator G have gradually been reduced to a small relative value. The independent excitation of the main machine M has consequently been correspondingly reduced and the speed increased. Assuming that the switch H is open the compounding of the main machine M (running as a motor delivering a constant torque) has been gradually increased from a very small percentage of compounding at position 4, when the armature current is small, to very high percentage of compounding at position 10, when the armature current is large. That is to say, the independent excitation is in position 10 of a very small value as compared with the excitation which is obtained directly from the line current. In position 11 the motor side of the motor-generator is even disconnected from the line circuit and the speed of the same as well as the value of the independent excitation furnished by this source has become 0. The main machine is now running at a very high speed as a series motor having weak field excitation. It will be understood that, if the switch H were closed, the independent field excitation would be the only field excitation for the main machine M and the controller C could in this case not be moved into its extreme positions. 10 and 11. It will also be understood that the motor-generator will run at a certain fixed speed (whatever it happens to be) at any one position of the controller though it is being driven as a plain series motor.

The series field winding of the motor-generator solves the problem of providing efficient field excitation for the motor-generator at heavy loads and it avoids the difficulty with a shunt winding which has to be designed for a high potential machine of comparatively small size or proportions.

Having thus described my invention what

I claim and desire to secure by Letters Patent of the United States is—

1. The combination of a series wound motor-generator and a main dynamo electric machine having its excitation field winding connected to the generator side of the said motor-generator; together with means for varying the speed and the output of the said motor-generator.

2. The combination of a power circuit, a main dynamo electric machine, a motor-generator provided with a high voltage motor winding and a low voltage generator winding upon the same armature core, said high voltage motor winding being operatively connected to the said power circuit and the said low voltage generator winding being connected to the excitation field winding of the said main dynamo electric machine; together with means for varying the output of the said motor-generator.

3. The combination of a main motor or dynamo and a power circuit therefor, a motor-generator operatively connected to the said power circuit with its motor armature in series with its excitation field winding, the generator armature of the said motor-generator being connected to the excitation field winding of the said main motor or dynamo, with means for varying the speed and the output of the said motor-generator.

4. The combination of a power circuit, a main motor or dynamo having a single distributed field winding for excitation and for compensation, with a motor-generator operatively connected to the said power circuit with its motor armature in series with its excitation field winding and having its generator armature connected to the distributed field winding of the said main motor or dynamo.

5. The combination of a power circuit, a main dynamo electric machine having a single distributed field winding for excitation and for compensation, a motor-generator provided with a high voltage motor winding and a low voltage generator winding upon the same armature core, said high voltage motor winding being operatively connected to the said power circuit and the said low voltage generator winding being connected to the distributed field winding of the said dynamo electric machine; together with means for varying the compounding of the excitation of the said main dynamo electric machine.

6. A power circuit, a main motor or dynamo having a single distributed field winding for excitation and for compensation; in combination with a series wound motor-generator operatively connected to the said power circuit and adapted to furnish a separate or independent current for the excitation of the said main motor or dynamo, and means for varying the compounding of the excitation of the said main motor or dynamo.

7. A power circuit, a reversible main motor or dynamo of the commutator type, a distributed field winding for the said main motor or dynamo having one of its field terminals connected to one of the armature terminals; in combination with two other field terminals, each located at less than 180 electrical degrees from the first mentioned terminal, and means for connecting one or the other of the said two field terminals to the said power circuit.

8. A power circuit, a reversible main motor or dynamo of the commutator type, a distributed field winding for the said main motor or dynamo having one of its field terminals connected to one of the armature terminals; in combination with an auxiliary source of E. M. F. supplying a separate or independent current for the excitation of the said main motor or dynamo, and means for reversing the direction of the excitation current obtained from the said auxiliary source of E. M. F.

9. A power circuit, a separately or independently excited main motor or dynamo of the commutator type, a distributed field winding for the said main motor or dynamo having one of its main field terminals connected to one of the armature terminals; in combination with two other main field terminals provided with means for connecting one or the other of the said two field terminals to the said power circuit, and additional means for closing a short-circuit between the said two field terminals.

10. A power circuit, a reversible main motor or dynamo of the commutator type having a distributed field winding which is connected together with the armature as one unit; in combination with an auxiliary source of E. M. F. adapted to supply a separate or independent excitation current for the said main motor or dynamo and means for reversing the direction of the said independent excitation current and additional means for varying the compounding of the excitation of the said main motor or dynamo.

In testimony whereof I have signed my name to this specification in the presence of two subscribing witnesses.

ROBERT LUNDELL.

Witnesses:
C. J. KINTNER,
M. F. KEATING.

Copies of this patent may be obtained for five cents each, by addressing the "Commissioner of Patents, Washington, D. C."